United States Patent [19]

Yovichin

[11] Patent Number: 5,313,827
[45] Date of Patent: May 24, 1994

[54] METHOD AND APPARATUS FOR DETECTING PLY DEFECTS IN PNEUMATIC TIRES

[75] Inventor: Albert J. Yovichin, N. Canton, Ohio

[73] Assignee: The Goodyear Tire & Rubber Company, Akron, Ohio

[21] Appl. No.: 952,066

[22] Filed: Sep. 28, 1992

[51] Int. Cl.[5] .................. E01C 23/00; G01M 17/02
[52] U.S. Cl. ..................................... 73/146; 73/146.2
[58] Field of Search .............. 73/146, 146.2, 655; 51/165.72, 165.74, 165.76

[56] References Cited

U.S. PATENT DOCUMENTS

| 3,644,047 | 2/1972 | Brown et al. | 356/109 |
|---|---|---|---|
| 3,675,375 | 7/1972 | Enabnit et al. | 51/165.74 |
| 3,835,591 | 9/1974 | Cimprich | 51/106 R |
| 3,866,360 | 2/1975 | Monajjem | 51/165.72 |
| 4,089,226 | 5/1978 | Kraska et al. | 73/146 |
| 4,266,428 | 5/1981 | Ho | 73/146 |
| 4,402,218 | 9/1983 | Engel | 73/146 |
| 4,414,843 | 11/1983 | Kounkel et al. | 73/146 |
| 4,475,384 | 10/1984 | Christie | 73/146 |
| 4,896,531 | 1/1990 | Hayes | 73/146 |
| 4,934,184 | 6/1990 | Tsuji | 73/146 |
| 5,095,744 | 3/1992 | Macecek et al. | 73/146 |
| 5,144,773 | 9/1992 | Flores et al. | 51/165.74 |

FOREIGN PATENT DOCUMENTS

26875/88 12/1988 Australia .

Primary Examiner—Richard E. Chilcot, Jr.
Assistant Examiner—William L. Oen
Attorney, Agent, or Firm—David E. Wheeler

[57] ABSTRACT

In a method and apparatus for detecting ply defects in a pneumatic tire, measurements on the tire are obtained at two levels of tire inflation, and the data obtained in the two measurements are compared. Broken reinforcement cords in the tire cause changes in the peaks of the data obtained at the two inflations that are out of proportion when compared to data changes observed in non-damaged tires. The apparatus of the invention provides means for inflating tires to predetermined pressures and has displacement sensors for measuring peaks and valleys in the sidewall of a tire. The apparatus may also include a computer for collecting data, analyzing data, and providing a signal when a defective tire is recognized.

13 Claims, 7 Drawing Sheets

METHOD AND APPARATUS FOR DETECTING PLY DEFECTS IN PNEUMATIC TIRES

BACKGROUND

The invention relates to a method and apparatus for detecting broken reinforcement cords in a tire sidewall.

When a tire goes flat, is run long periods of time underinflated or hits road objects, the reinforcement cords in the carcass ply are sometimes broken without any visible change in the tire. When the cords are broken, however, eventually there is a separation that manifests itself in what is called a zipper break (because it looks like an open zipper) in the sidewall.

Unseen cord breaks are particularly a problem when retreading tires, because the expense and time needed to retread a defective carcass is wasted.

Although some experienced individuals have acquired the ability to recognize such sidewall defects with good precision on observation, such individuals are scarce, and it is important that a correct diagnosis be made each time a tire carcass is inspected prior to retreading.

X-ray inspection has been used in retreading operations, but x-ray equipment is expensive, requires extra safety precautions to use, and some breaks, where the broken ends are not displaced, may not be observable on the x-ray screen.

Commercial ultrasonic units are believed to be used by Bandag in retreading operations.

It is an object of the present invention to provide a reliable, inexpensive method of detecting cord breaks in the carcass of a pneumatic tire, and to provide an apparatus to be used in the method. Other objects of the invention will be apparent from the following description and claims.

SUMMARY OF THE INVENTION

A method for detecting defects in a pneumatic tire is provided. In the method, a tire is inflated to a minimal pressure, in the range of 0.5 to 10 psi, to establish a continuous baseline measurement for sidewall anomalies and bumps, when the tire is rotated in the proximity of a fixed displacement sensor. A continuous baseline measurement around the tire is thus established. In a further step in the method, the tire is inflated to an elevated pressure, about 5 to 30 psi above the baseline pressure, and the tire is rotated in proximity to the fixed displacement sensor to obtain a continuous elevated pressure measurement around the tire. The baseline measurement is then compared with the elevated pressure measurement and significant differences are noted. In a further embodiment of the method, software may be provided that compares the data and indicates on a yes/no basis whether the tire is suitable for retreading.

An apparatus for implementing the method is also provided. The apparatus comprises (a) a base unit having a rotatable mandrel, adapted to hold a tire while rotating, mounted on the base unit, (b) support means for supporting displacement sensors attached to the base, (c) displacement sensors attached to the support means such that the displacement sensors are in the proximity of a tire sidewall when the tire is mounted on the mandrel, and (d) means for inflating the tire on the mandrel to a specific pressure and maintaining said specific pressure constant during testing. The displacement sensors may be contact displacement sensors or non-contact displacement sensors.

During testing, the apparatus is adapted to rotate the mandrel between 3 and 30 rpm.

In a preferred embodiment, the apparatus further comprises a computer and software that is adapted to collect data, compare data, and provide a yes/no indication of the suitability of the tire for retreading.

The apparatus further comprises an air regulator for maintaining air pressure within the tire at a constant pressure during testing.

DETAILED DESCRIPTION OF THE INVENTION

Figure 1:
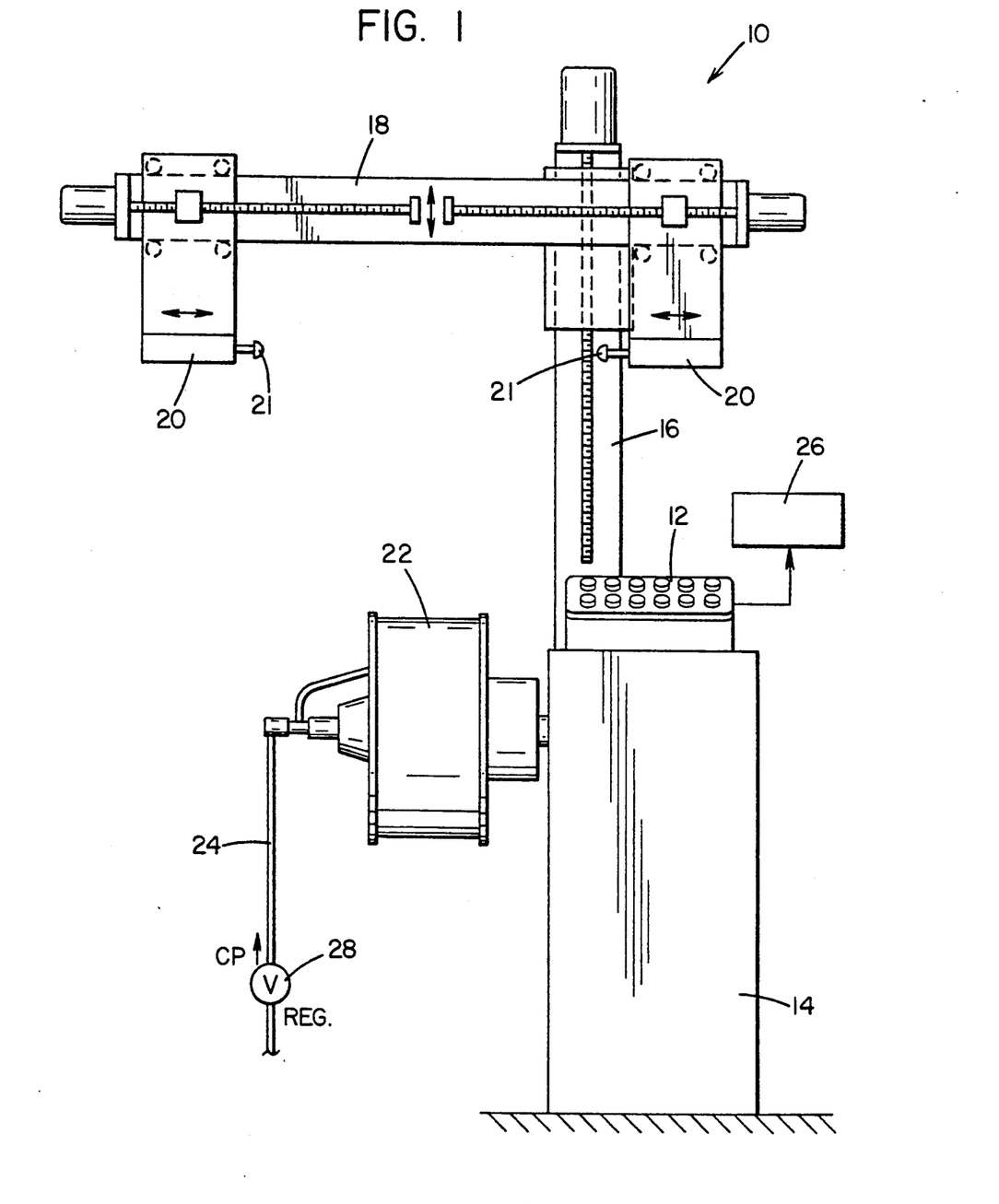
FIG. 1 illustrates the apparatus of the invention.

With reference now to FIG. 1, the apparatus of the invention 10 comprises a tire retreading machine (basically represented by base 14) which has been modified by the addition of vertical support strut 16, cross support 18, displacement sensors 20, and computer 26 (for collecting and analyzing data from displacement sensors 20). Support strut 16 is geared so that cross support 18 moves up and down, and cross support 18 has slides so that displacement sensors 20 move laterally independently. When a tire 30 (see FIG. 2) is mounted on mandrel 22, the mobility of the displacement sensors, up and down and side to side, makes it possible for the displacement sensors to accommodate any size tire.

Figure 2:
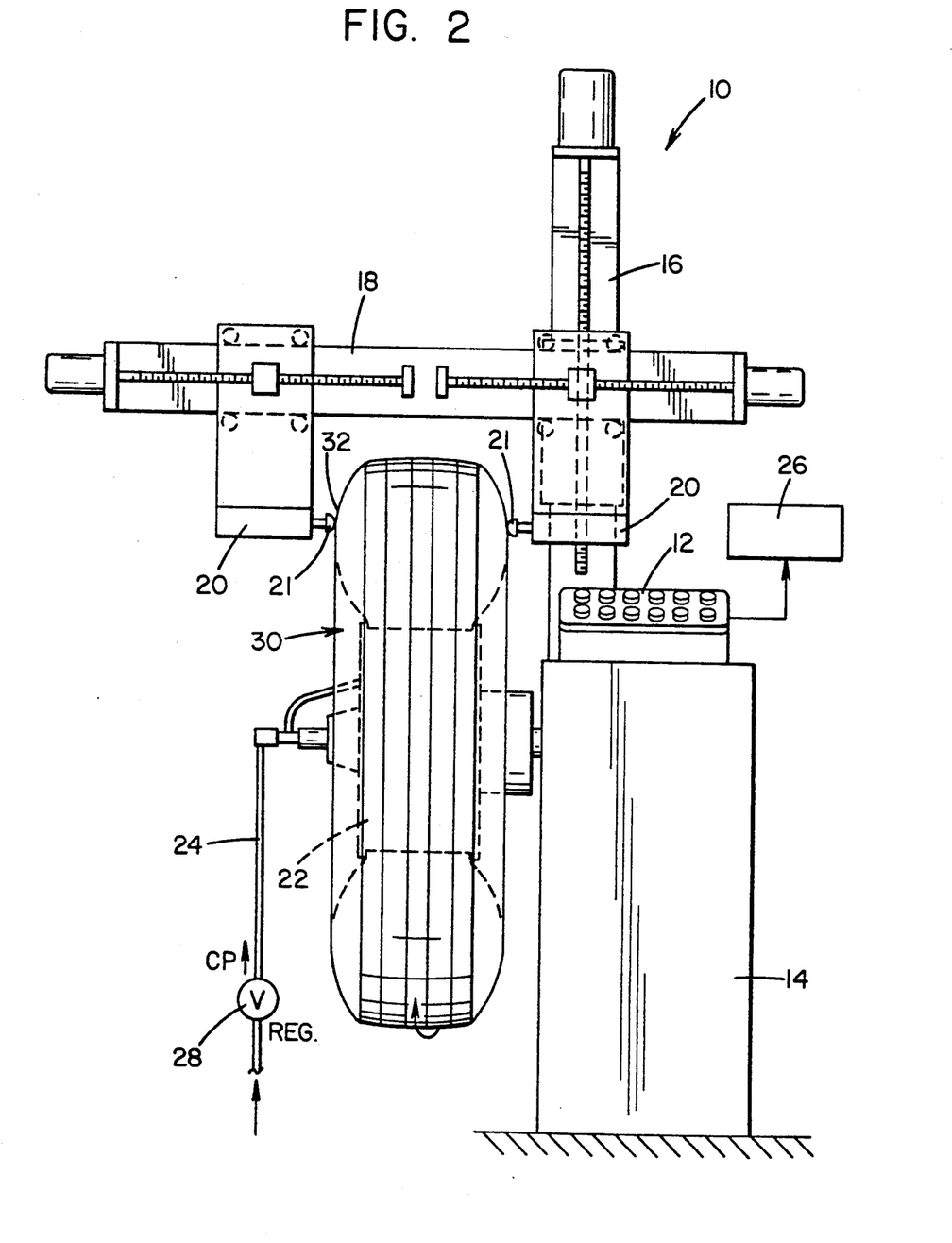
FIG. 2 illustrates a closeup of the tire mounting portion and sensor portion of the apparatus with a mounted tire.

FIG. 2 illustrates a tire 30 mounted on the apparatus and contacts 21 of displacement sensors 20 in the proximity of sidewalls 32.

In the method of the invention, when a tire 30 is mounted on mandrel 22, air is pumped into the tire 30 through hose 24, to a pressure at least sufficient to provide tension between tire 30 and mandrel 22, so that the tire does not move on the mandrel. It is believed that such sufficient air pressure is about 0.5 psi, and when used in the method of the invention, minimum air pressure (for obtaining baseline measurements) is between 0.5 and 10 psi. In the illustrated embodiment, 3 psi inflation is used to establish a baseline in the testing of a tire. The desired pressure in the tire is selected by controls 12, and regulator 28 maintains the pressure precisely as selected.

In a preferred embodiment, a minimum pressure differential of 20 psi between the baseline measurement and the elevated pressure measurement, provides broadest use of the invention over a wide range of tire sizes.

In the illustrated embodiment, the apparatus is equipped with two regulators 28.

Figure 3:
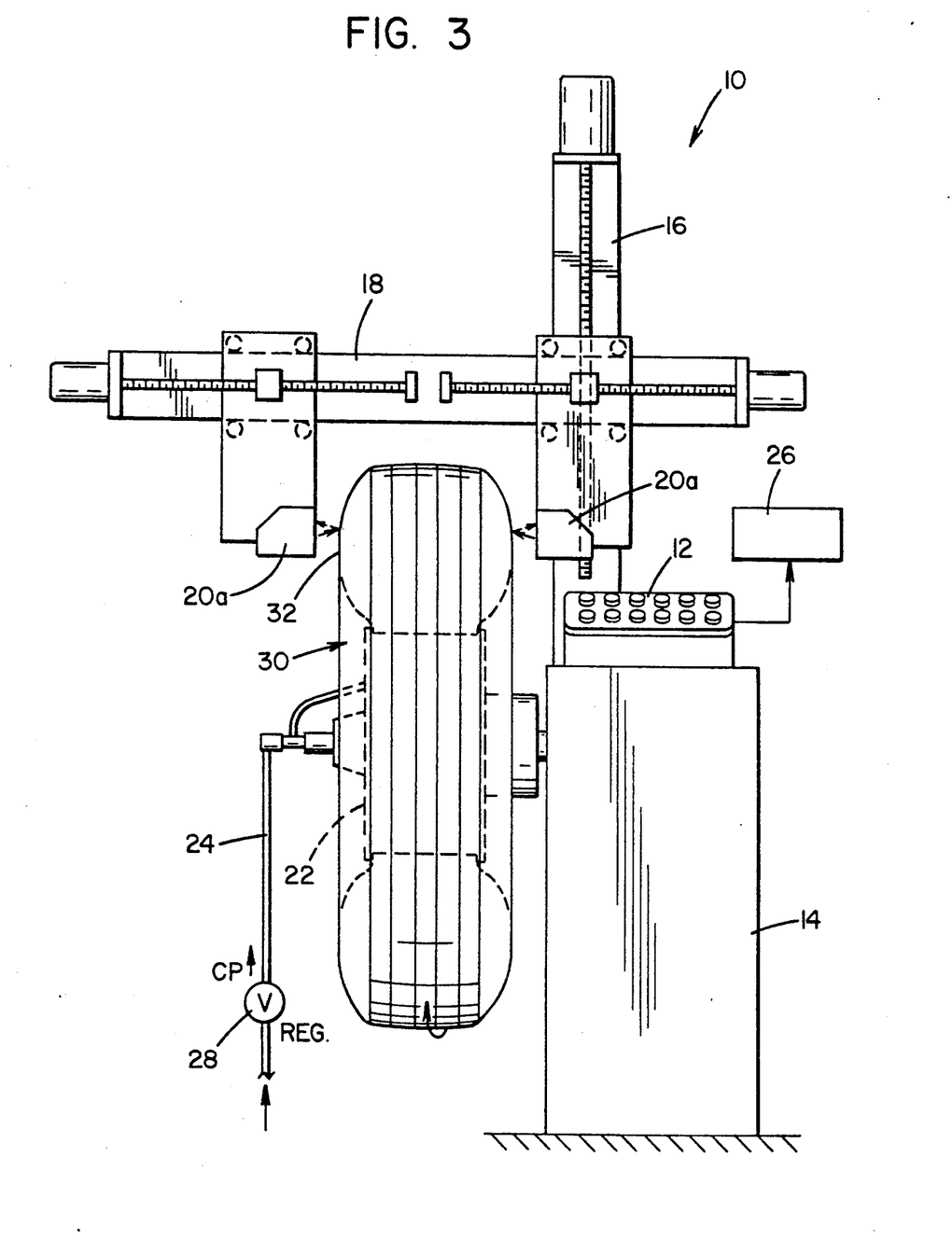
FIG. 3 illustrates a closeup of the tire mounting portion and sensor portion of an embodiment using laser displacement sensors.
Figure 4:
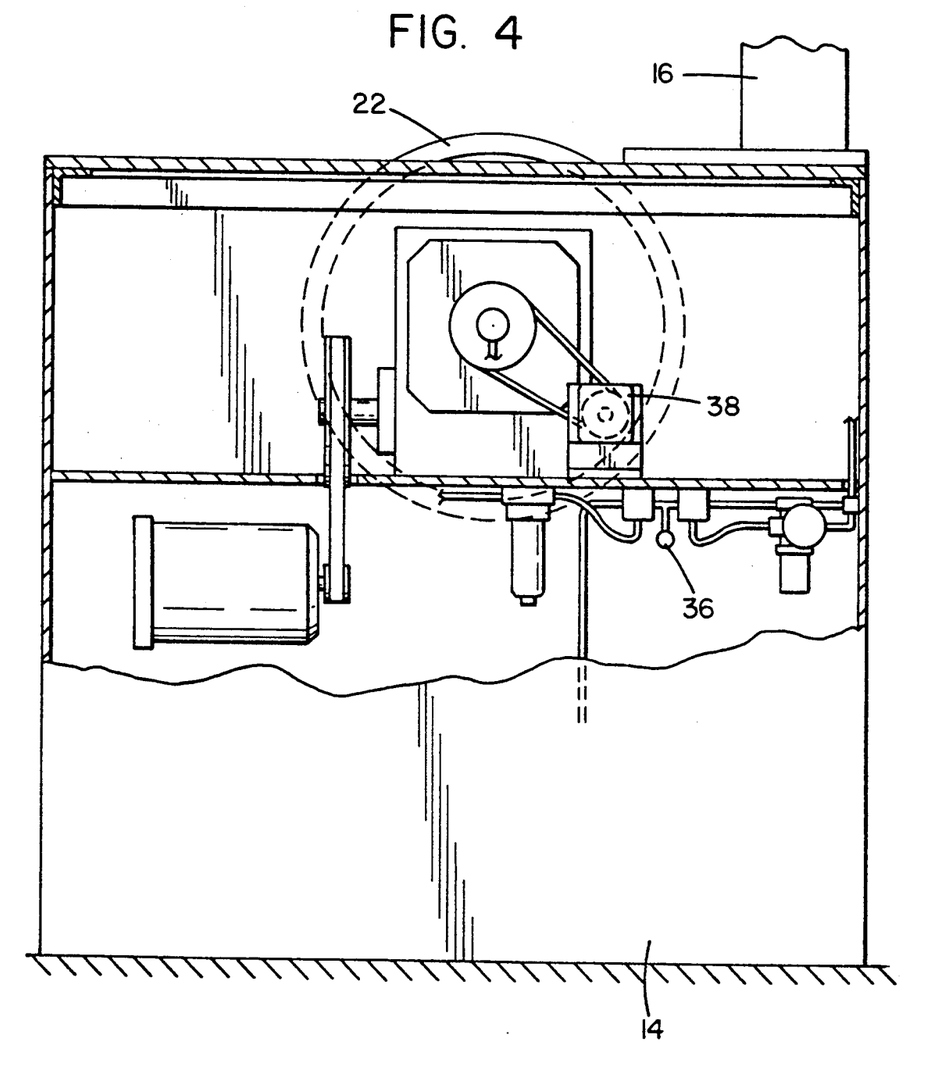
FIG. 4 illustrates a portion of the apparatus in breakaway illustrating a pressure switch and an encoder.

With reference now to FIGS. 3 and 4, in addition to air regulators 28, the illustrated apparatus is also equipped with a pressure switch 36 which is used to convey pressure data to the computer. The pressure switch makes it possible for the computer to recognize conditions where air pressure is not maintained at the desired level, such as when there is a hole or a break in a tire.

An elevated pressure measurement is obtained by inflating the tire 30 on mandrel 22 to a pressure of about 5.5 to 40 psi, preferably 15 to 25 psi, and in the illustrated embodiment 20 psi, rotating the tire in proximity to displacement sensors 20, and collecting the data generated by the displacement sensors.

It is preferred that a lower inflation, such as 20 psi, is used, since sufficient data is obtained, and there will be minimal impact if the tire ruptures during testing at this pressure. Those skilled in the art will recognize that if proper safety cages are used, more exaggerated results will be obtained at higher pressures.

An encoder 38 (FIG. 4) is used (2048 pulses in the illustrated embodiment) to pinpoint the position of the tire in its rotation so that points on a tire related to the baseline measurement can be precisely coincided with the position of the same points in the elevated pressure measurement.

Those skilled in the art will recognize that the order of obtaining a baseline measurement and an elevated pressure measurement is not important and either one may be obtained first.

After the baseline measurement and the elevated pressure measurements are obtained, the measurements are compared. The amplitude of the data generated in the elevated pressure measurement is greater than the amplitude of the data obtained in the baseline pressure measurement, but in a sound tire, all the peaks and valleys will show a proportional change. In a tire in which carcass cords are broken, the differences in the peaks corresponding to the broken cords will be significantly exaggerated in the elevated pressure measurement. When such differences are noted, the tire is scrapped.

In a preferred embodiment, the software in computer 26 will be adapted to recognize significant differences in the baseline measurement and the elevated pressure measurement and will automatically provide a reject signal, in the form of flashing lights, buzzers or bells, when predetermined logic conditions are met. Or, the apparatus may be adapted to automatically spray the tire with ink or paint when a failed tire is recognized.

In its analysis of the data, the computer is used to provide a Fourier transformation of the data and the first nine harmonics are removed. Those skilled in the art will recognize that the method is operable if anywhere from 1 to 20 harmonics are removed. The data is then passed through an inverse Fourier transformation and normalized to zero, which causes normal data to fall within a narrow band of values which is determined by testing, for example between ±0.010 in. The logic in the software is set so that when data outside a preselected range is seen in the inverse Fourier transformation, the reject sequence is initiated.

In the embodiment illustrated in FIG. 1, displacement sensors 20 are magnetostrictive displacement sensors and readings are obtained by contact between the tire sidewall and the contact elements 21. The contact elements 21 are loaded with a spring tension sufficient to provide a response in contact element 21. The spring tension will be in the range of less than 1 lb and up to 10 lbs, preferably less than 1 lb to 5 lbs tension. In order to obtain as smooth a measurement as possible, the displacement sensors can be aligned to make contact with the scuff rib on the sidewall, or another smooth surface.

Non-contact displacement sensors, such as ultrasonic displacement sensors, laser displacement sensors, and transducer displacement sensors can be used on the apparatus. The displacement sensors can be easily changed by removing displacement sensors 20 and substituting in their place the non-contact displacement sensors, transducer displacement sensors, or other types of displacement sensors known in the art.

FIG. 3 illustrates the apparatus equipped with laser displacement sensors 20a. Laser displacement sensors are relatively inexpensive, and since there are no moving parts, are usually more responsive and accurate than contact displacement sensors. Low intensity diode lasers do not require stringent safety features of the kind seen on lasers used for surgery or for cutting metals. Examples of laser displacement sensors that can be used in the invention are available from Aromat, 629 Central Ave., New Providence, N.J., and Keyence Corp., 17-17 Route 208, North Fairlawn, N.J.

The apparatus of the invention can also be used to test new tires for ply gaps.

The invention is further illustrated with reference to the following example.

EXAMPLE

Figure 5:
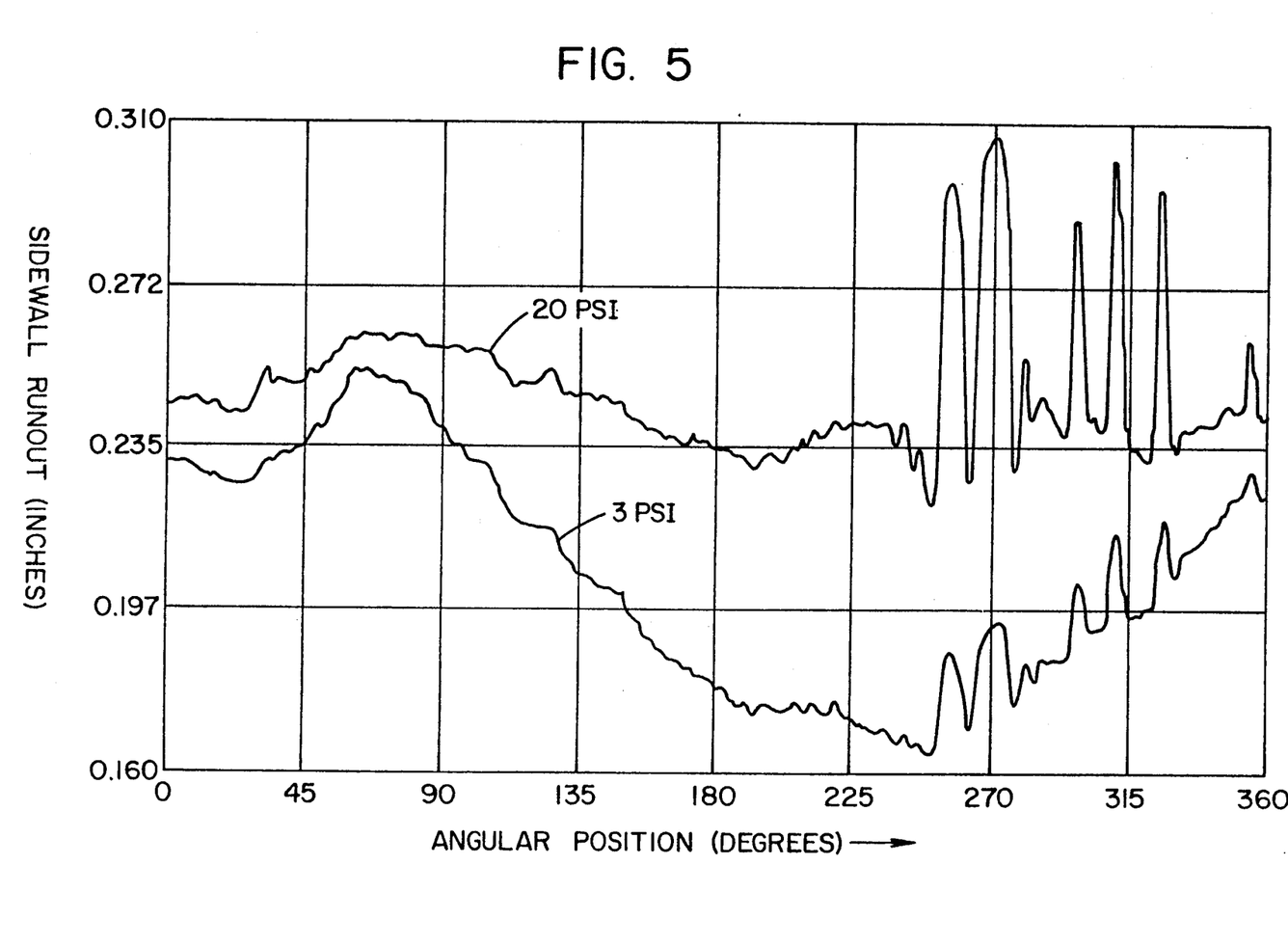
FIG. 5 illustrates plots of sidewall runout at 3 psi and 20 psi on the same graph.
Figure 6:
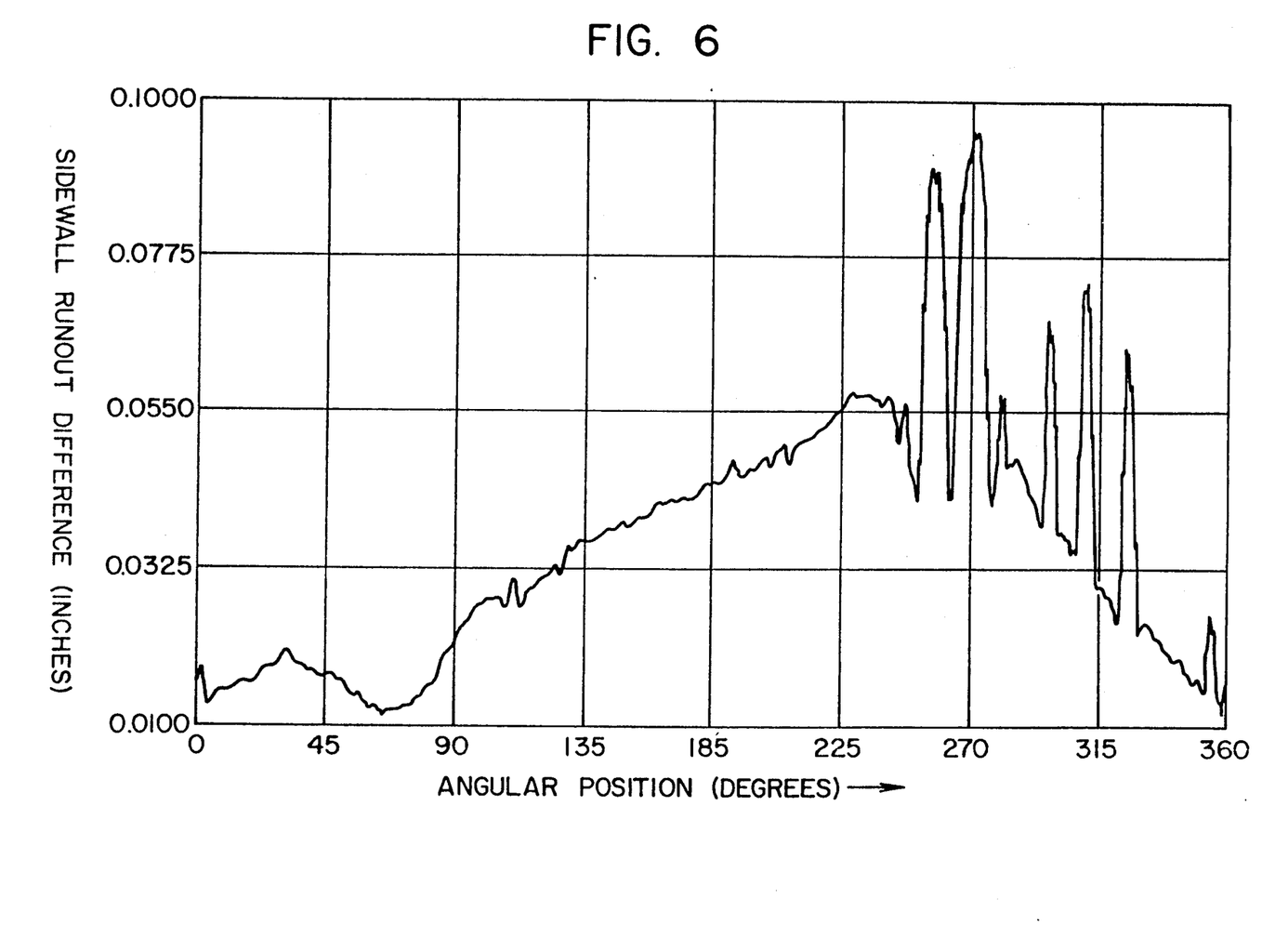
FIG. 6 illustrates a graph showing the results of the difference between the two plots in FIG. 5.
Figure 7:
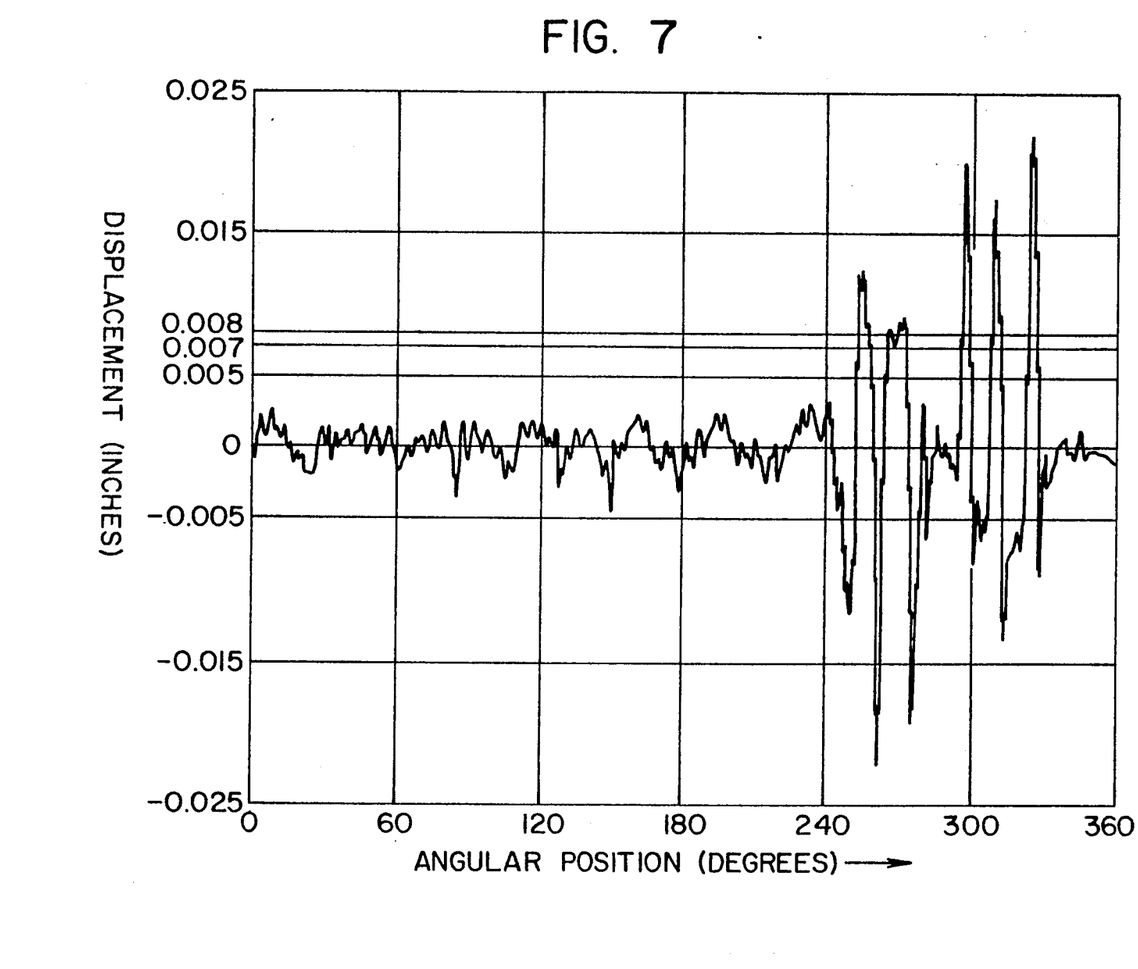
FIG. 7 illustrates Fourier treatment of the plots in FIG. 5.

With reference now to FIGS. 5, 6, and 7, data was obtained and analyzed on a tire with broken carcass reinforcement cords. This example is particularly interesting since x-ray analysis failed to detect any broken cords in this tire. In FIG. 5, the measurements obtained on the tire at 3 psi inflation and at 20 psi inflation are plotted on the same graph, illustrating the difference in amplitude of the peaks encountered. In FIG. 6, the data from the two graphs are subtracted to provide a composite graph of the two measurements. FIG. 7 illustrates the graphed results of passing the data through a Fourier transformation, removing the first nine harmonics and passing the resulting data through an inverse Fourier transformation and normalizing to zero. It is noted that this treatment of the data has the effect of leveling out the normal displacement data to a range between ±0.005 in. The peaks corresponding to the broken reinforcement cords, however, even after the Fourier transformation and inverse Fourier transformation and normalization to zero, are substantially greater than ±0.005 in.

While specific embodiments of the invention have been illustrated and described, those skilled in the art will recognize that the invention can be variously modified and practiced without departing from the spirit of the invention. The invention is limited only by the following claims.

What is claimed is:

1. A method for detecting defects in a pneumatic tire comprising the steps of:
   (a) inflating said tire at a minimal pressure in the range of 0.5 to 10 psi, said pressure comprising a baseline pressure.
   (b) rotating said tire in proximity to a fixed displacement sensor, thereby obtaining a continuous baseline measurement around said tire,
   (c) inflating said tire 5 to 30 psi above said baseline pressure, said pressure comprising an elevated pressure, (d) rotating said tire in proximity to said fixed displacement sensor, thereby obtaining a continuous elevated pressure measurement around said tire, and (e) comparing the baseline measurement with the elevated pressure measurement and noting significant differences.

2. The method of claim 1 in which said baseline pressure is 1 to 10 psi and said elevated pressure is 15 to 25 psi.

3. The method of claim 1 in which said baseline pressure is 5 psi, and said elevated pressure is 20 psi.

4. The method of claim 1 in which the pressure difference between baseline and elevated pressure measurements is selected to be 20 psi.

5. An apparatus for detecting defects in a pneumatic tire comprising
(a) a base unit (14) having a rotatable mandrel (22) mounted thereon, said mandrel being adapted for holding a tire,
(b) support means for supporting displacement sensors in the proximity of said tire attached to said base, said support means comprising a vertical support strut (16) attached to said base unit (14) and cross support (18) attached to said vertical support (16),
(c) displacement sensor means (20,20a) attached to said support means wherein support strut (16) is geared so that said cross support (18) moves up and down, and said cross support (18) has slides so that said sensor means can move laterally independently such that said sensor means can be moved up and down and side to side into the proximity of a tire sidewall when said tire is mounted on said mandrel, and
(d) means for inflating said tire on said mandrel to a specific pressure and maintaining said pressure constant during testing.

6. The apparatus of claim 5 in which said displacement sensor means are contact displacement sensors adapted to contact the sidewall of the tire when mounted on said mandrel.

7. The apparatus of claim 5 in which said displacement sensor means are non-contact displacement sensors which measure anomalies in a tire without contacting said sidewall when the tire is mounted on the mandrel.

8. The apparatus of claim 5 wherein said displacement sensor means is selected from the group consisting of magnetostrictive, laser, ultrasonic, and electronic transducer displacement sensors.

9. The apparatus of claim 6 in which said contact displacement sensors are loaded with a spring tension of 1 to 10 lbs.

10. The apparatus of claim 5 in which said mandrel is adapted to rotate at from 3 to 30 rpm.

11. The apparatus of claim 5 which further comprises computer hardware adapted to collect data from said displacement sensors.

12. The apparatus of claim 11 which further comprises software adapted to compare data and provide a yes/no indication of the condition of the tire.

13. The apparatus of claim 5 which further comprises an air regulator for maintaining air pressure within the tire at a constant pressure during testing.

* * * * *